June 15, 1965 C. VAN DER LELY 3,188,789
TEDDERS
Filed Aug. 8, 1962 8 Sheets-Sheet 1

INVENTOR.
CORNELIS VAN DER LELY
BY
Mason, Mason & Albright
Attorneys

INVENTOR.
CORNELIS VAN DER LELY
BY
Mason, Mason & Albright
Attorneys

June 15, 1965  C. VAN DER LELY  3,188,789
TEDDERS

Filed Aug. 8, 1962  8 Sheets-Sheet 8

INVENTOR.
CORNELIS VAN DER LELY
BY
Mason, Mason & Albright
Attorneys

3,188,789
TEDDERS
Cornelis van der Lely, Zug, Switzerland, assignor to C. van der Lely N.V., Maasland, Netherlands, a Dutch limited-liability company
Filed Aug. 8, 1962, Ser. No. 215,590
Claims priority, application Netherlands, Sept. 1, 1961, 268,897; July 13, 1962, 281,131
21 Claims. (Cl. 56—372)

This invention relates to tedders of the kind comprising a frame movable over the ground and a tined body rotatably carried by the frame.

An object of the invention is the provision of a tedder which can be readily adjusted to work crop or like material in different ways.

According to the invention, there is provided a tedder of the kind set forth, wherein guide members are provided for the crop or like material displaced by the tined body during use of the tedder, the construction and arrangement of the guide members being such that, in a first setting or arrangement, they form the crop or like material into a single swath and, a second setting or arrangement, into two separate swaths, the width of said single swath being less than the total width of the two separate swaths.

For a better understanding of the invention, and to show how the same may be carried into effect, reference will now be made, by way of example, to the accompanying drawings, in which:

FIGURE 1 is a plan view of an implement in accordance with the invention,

FIGURE 2 is a fragmentary view, to an enlarged scale, of part of the implement as seen in the direction indicated by the arrow II of FIGURE 1, FIGURE 3 is an elevation, to an enlarged scale, showing an alternative embodiment of part of the implement illustrated in FIGURE 1, FIGURE 4 is a section taken on the line IV—IV of FIGURE 3, FIGURE 5 is a fragmentary view corresponding generally to FIGURE 2 and showing further alternative embodiment of part of the implement, FIGURE 6 is a plan view of an alternative embodiment of an implement in accordance with the invention coupled to the rear of a tractor, FIGURE 7 is a fragmentary view, to an enlarged scale, of part of the implement as seen in the direction indicated by the arrow VII of FIGURE 6, FIGURE 8 is a section, to an enlarged scale, taken on the line VIII—VIII of FIGURE 6, FIGURE 9 is a view as seen in the direction indicated by the arrow IX of FIGURE 7, and FIGURE 10 is a side elevation of part of the implement illustrated in FIGURES 1 to 5, the said part being provided with an additional member.

Figure 1:
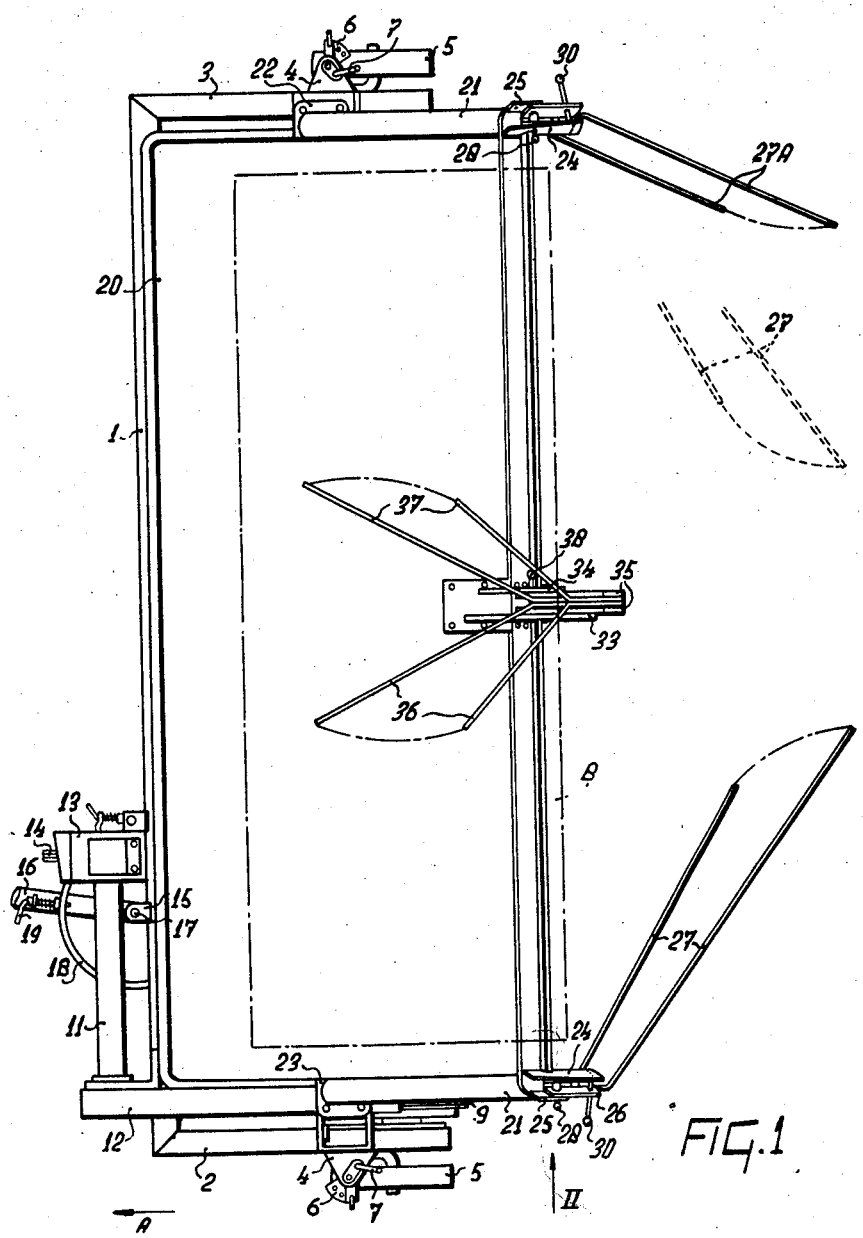

Referring to FIGURES 1 to 5 of the drawings, the implement which is illustrated is a tedder having a frame afforded by a beam 1 which extends transverse to the intended direction of travel and two beams 2 and 3 which are secured to the opposite ends of the beam 1 so as to extend perpendicular thereto. The free ends of the said beams 2 and 3 carry supports 4 for substantially vertical shafts whose lowermost ends are bent to form the horizontal axles of two castor ground wheels 5. The said substantially vertical shafts are turnable in the supports 4 to alter the angular settings of the planes of rotation of the ground wheels 5 and two locking mechanisms 6 are provided to retain the said shafts and ground wheels 5 in chosen angular settings.

The levels of the axles of the ground wheels 5 relative to the frame of the implement can be raised or lowered by turning crank handles 7 at the uppermost ends of screw-threaded rods in appropriate directions.

The implement has a rake member in the form of a cylindrical body or drum 8 which is only diagramamtically illustrated in FIGURE 1. The said body 8 is provided with a number of projecting tines (not shown) and is rotatable about a substantially horizontal shaft, coinciding with its own longitudinal axis, the said shaft having its opposite ends connected to the two frames beams 2 and 3.

A single or multiple pulley 9 is secured to one end of the body 8 and is connected by single or multiple V-belts or the like to a further pulley which is secured to one end of a shaft disposed within a cylindrical casing 11. The single or multiple V-belts or the like are surrounded by a screen or casing 12. The shaft disposed within the casing 11 is connected to pinions disposed within a gearbox 13 from which a rotatable input shaft 14 projects forwardly of the implement. A forked bracket 15 is secured to the beam 1 adjacent the gearbox 13, the said bracket supporting a vertical pivot pin 17 between its limbs about which pin a draw-bar 16 is turnable. A curved strip 18 whose center of curvature coincides with the longitudinal axis of the pivot pin 17 has its opposite ends secured to the beam 1 and a horizontal spring-loaded locking pin 19 which is carried by lugs mounted on the upper side of the draw-bar 16 is so disposed that its tip can enter any one of a number of holes formed in the strip 18. It will be apparent that the angular setting of the draw-bar 16 relative to the frame beam 1 will be determined by the particular hole in the strip 18 which is selected for co-operation with the locking pin 19.

The implement has a screen baffle or hood 20 which is disposed principally in front of the body 8 considered in the intended direction of travel of the implement, the baffle 20 being formed by a curved plate whose center of curvature coincides with the axis of rotation of the body 8 and by two flat side or end plates disposed at opposite ends of the body 8 in planes extending perpendicular to the said axis of rotation. The side or end plates are stiffened by tubes 21 which project upwardly and rearwardly from two support plates 22 and 23 respectively which plates are used to secure the opposite sides or ends of the baffle 20 to the frame beams 2 and 3 respectively.

Figure 2:
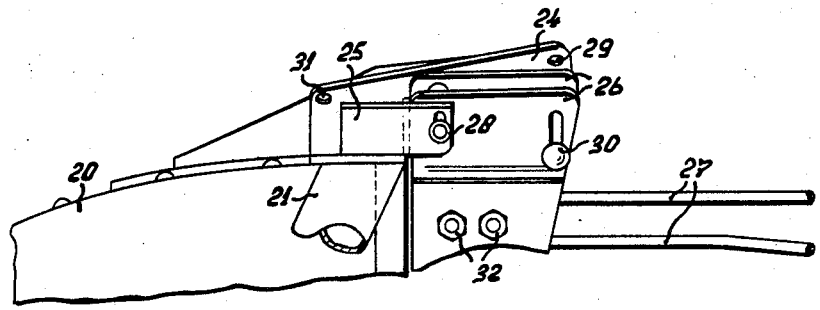

Adjacent the uppermost ends of the two tubes 21 two pairs of relatively spaced plates 24 and 25 are mounted, a removable pivot pin 28 extending transversely between each pair of plates. Two support plates 26 are turnable about the pivot pin 28 between the plates 24 and 25, the support plates 26 having a number of guide rods 27 secured to them. Each of the removable pivot pins 28 is contained in a substantially vertical plane extending parallel to the axis of rotation of the body 8, each such pivot pin being inclined at an angle of approximately 20° to the horizontal with its uppermost end disposed closest to the center of the implement. As can be seen in FIGURE 2, the plates 24 are larger than the plates 25 and a portion of each plate 24 which projects rearwardly of the baffle 20 is formed along its edge with a number of holes 29 any one of which can co-operate with the tip of a locking pin 30 which is entered through two aligned holes in the corresponding support plates 26. Each plate 24 is also formed with a hole 31 which can co-operate with the tip of the locking pin 30 to retain the plates 26 and rods 27 in an inoperative position above the baffle 20 upon turning these parts through approximately 180° about the removable pivot pin 28 relative to the position illustrated in FIGURE 2.

The rods 27 are formed in integral pairs and are preferably made from material such as spring steel. The junctions between the integral pairs take the form of U-shaped bends which are clamped between the support plates 26 by pairs of bolts 32 which are entered between the limbs of the said bends. Only two of the bars 27 can be seen in FIGURE 2 of the drawings but there are, preferably, eight such bars at each end or side of the body 8. The portions of the bars 27 which are clamped between the support plates 26 each extend perpendicular to the pivot pin 28 and are all contained in a plane making an angle of about 10° with a plane extending perpendicular to the longitudinal axis of the pin 28. Considered in a direction perpendicular to the plane containing the clamped portions of the rods 27, all the rods in each group, except the uppermost rod, are bent downwardly away from the uppermost rod at locations spaced from the support plates 26. In other words, each rod 27 has a clamped portion extending parallel to the uppermost rod 27 and a further portion which is downwardly inclined when considered in the direction just mentioned. The arrangement is preferably such that the distances between the free ends of the neighboring rods 27 are approximately the same. In the embodiment illustrated in FIGURE 1, each rod 27 has a length of about 175 cm. and each rod 27 is bent in a direction towards the center of the implement at a location spaced about 15 cm. from the point at which the said rod is clamped between the support plates 26. Each of the said bends is so formed that portions on opposite sides of the bend are inclined to one another at an angle of about 60°. It will be seen from FIGURES 1 and 2 that, when the locking pin 30 is entered in one of the holes 29, the corresponding group of rods 27 extends rearwardly of the baffle 20 at an inclination dependent upon the particular hole 29 which is selected whereas, when the locking pin 30 is entered in the hole 31, the group of rods 27 is located over and above the baffle 20.

Two relatively spaced vertical plates 33 and 34 are secured to the rearmost edge of the baffle 20 at approximately the center thereof. Two support plates 35 are turnably connected to the plates 33 and 34 by means of a horizontal pivot pin (not visible). Two groups of rods 36 and 37 are clamped by bolts between the two support plates 35. A horizontal locking pin 38 can be entered through two aligned holes in the support plate 35 and through any one of a number of holes formed in the plate 33. One of the said holes occupies a position such that, when it is in use, the rods 36 and 37 are retained in an inoperative position over and above the baffle 20, as shown in FIGURE 1, whereas the other holes are similar to the aforementioned holes 29 and can be employed to retain the rods 36 and 37 in selected operative positions in which they project rearwardly of the baffle 8 relative to the intended direction of travel of the implement.

The construction and arrangement of the two groups of rods 36 and 37 is very similar to the construction and arrangement of the groups of bars 27 which have previously been described except that, in this case, each rod has a length of about 100 cm. As can be seen in FIGURE 1, major portions of the rods 36 are bent over towards the lefthand side of the implement, considered in the intended direction of travel thereof, whilst major portions of the rods 37 are bent symmetrically in the opposite direction.

In the use of the implement, it will be propelled over the ground in the direction indicated by the arrow A in FIGURE 1 by a tractor or like vehicle coupled to the leading end (not shown) of the draw-bar 16. The input shaft 14 of the gearbox 13 is connected to the power take-off shaft of the tractor or like vehicle by a transmission shaft and a pair of universal joints. The direction of rotation is such that the tines of the body 8 which are located in a lowermost region of that body move over the ground towards the front of the implement, that is to say, in a direction similar to the direction A. Crop or like material which is engaged by the tines is lifted upwardly in front of the body 8 and is guided by the baffle 20 rearwardly over the top of the body 8. The said crop or like material then meets the guide members which are constituted by the various groups of rods 27, 36 and 37. In the working position of the implement which is illustrated in FIGURE 1, the groups of rods 36 and 37 occupy their inoperative positions while two groups of relatively long rods 27 are disposed at the opposite sides or ends of the body 8. One of the said groups of rods 27 is illustrated in broken lines in FIGURE 1.

It will be evident that the two groups of rods 27 act to collect the crop or like material into a single swath which is deposited centrally behind the implement. However, the implement may be arranged to form two separate relatively spaced swaths by bringing the groups of rods 36 and 37 into their operative positions and replacing the groups of rods 27 by alternative groups of rods 27A, one of which groups is illustrated in full lines in FIGURE 1. The rods 27A are of approximately the same length as the rods 36 and 37 and major portions thereof are bent over towards the center of the implement in such a way that portions lying on opposite sides of the said bends are inclined to one another at an angle of approximately 30° instead of an angle of approximately 60° as in the case of the rods 27. When the implement is arranged to form two swaths, each such swath has a width which is less than half the width of the body 8 while the total width of the two swaths which are formed is greater than the width of the swath which is formed when the implement is arranged to deposit only a central swath as has previously been described. The rods 36 and 37 are bent over towards the opposite sides or ends of the implement at different angles in such a way that, together, they form inclined surfaces which tend to guide the crop or like material towards the opposite sides or ends of the implement. The rods 27A, on the other hand, are all bent over at the same angle but, since they are all clamped to the inclined support plates 26, they also afford an inclined guide surface which tends to deflect crop towards the center of the implement.

The inclined mounting of the pivot pins 28 about which the groups of rods 27 or 27A are turnable causes the free ends of these rods to move closer to the center of the implement as the said ends are brought towards the surface of the ground. Thus, obviously, the width of the, or each, swath which is formed is varied by lowering or raising the rods 27 or 27A relative to the ground surface. At times when the implement is to be transported from one place to another without performing any working operation, all the rods 27 or 27A, 36 and 37 are retained in their inoperative positions over and above the baffle 20.

Figure 3:
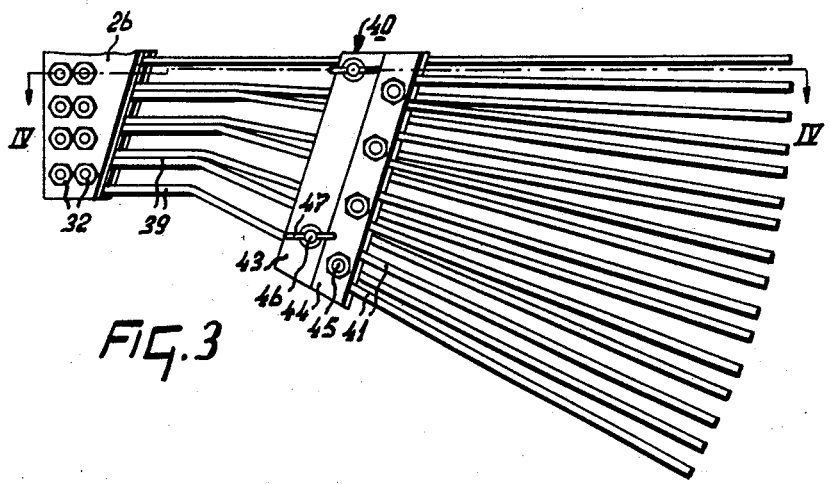
Figure 4:
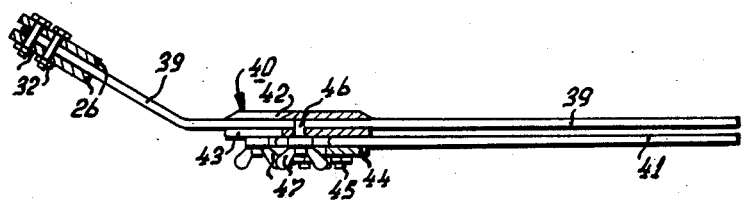

FIGURES 3 and 4 illustrate an alternative form of guide member for the crop in which four integral pairs of rods 39 are clamped between the support plates 26 by means of the bolts 32 in the manner previously described with reference to FIGURE 2. Each rod 39 has substantially the same length as one of the previously described rods 36 or 37. A slidable member 40 is mounted on the relatively diverging portions of the rods 39 in such a way that it can be slid between the retracted position shown in FIG- URES 3 and 4 and an extended position in which it is disposed substantially further away from the support plates 26.

The member 40 is comprised by two plates 42 and 43 which are disposed on opposite sides of the rods 39 and which can be drawn together into clamping engagement with these rods by two screw-threaded studs 46 which project from the plate 42 through holes in the plate 43 and which are provided with wing nuts 47. The member 40 carries four integral pairs of guide rods 41 which rods are secured to the plate 43 with the aid of a clamping plate 44 and four studs 45 which project from the plate 43 through matching holes in the plate 44. When these guide members are mounted at the opposite sides or ends of the body 8, they can be arranged to correspond to the previously described guide members having the rods 27A by disposing the slidable members 40 as illustrated in FIGURES 3 and 4 or, alternatively, they can be arranged to correspond to the guide members having the guide rods 27 by sliding the members 40 to their extended positions in which the rods 41 project a substantial distance beyond the free ends of the rods 39. When this position is reached, the total effective length of each guide member is substantially the same as that of the previously described guide members having the rods 27.

Figure 5:
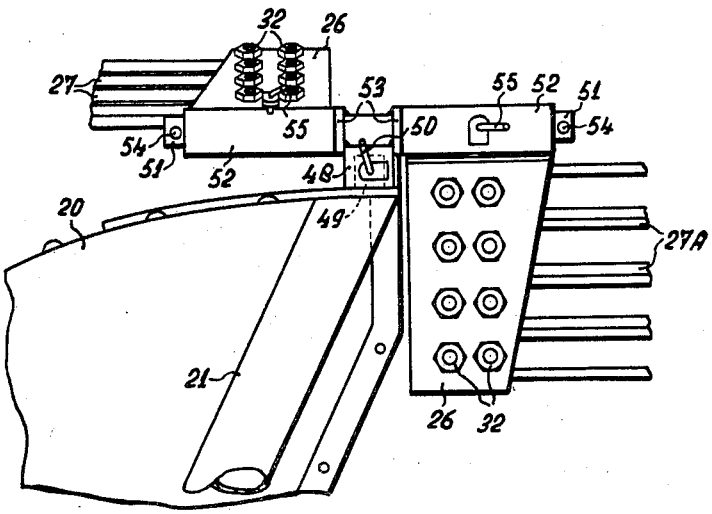

FIGURE 5 corresponds generally to FIGURE 2 but shows a further alternative construction and mounting of the guide members, those parts which correspond to parts which have already been described being designated by the same reference numerals. A vertical stub shaft 49 is located adjacent the rear edge of the baffle 20 at one side or end thereof and a bearing sleeve 48 is turnable thereabout. A horizontal locking pin 50 is connected to the bearing sleeve 48 and can be entered through a hole therein and through a matching hole in the stub shaft 49 to retain the bearing sleeve 48 in either one of two different angular positions relative to the stub shaft 49, which positions are 180° removed from one another. The uppermost end of the bearing sleeve 48 carries a horizontal shaft 51 which, in both the said angular positions of the bearing sleeve 48, extends substantially parallel to the intended direction of travel of the implement. Two bearing sleeves 52 are turnable about the opposite ends of the shaft 51 on opposite sides of the stub shaft 49, each of these bearing sleeves 52 carrying a pair of support plates 26 to which rods 27 having a length of about 175 cm. and rods 27A having a length of about 100 cm. are respectively clamped by bolts 32. Each bearing sleeve 52 is retained against axial displacement relative to the shaft 51 by a fixed collar 53 at one end and by a small transverse pin 54 at the opposite end. Each one of the two bearing sleeves 52 can be retained in either of two different angular settings relative to the shaft 51 by means of a locking pin 55 which can be entered through a hole in the bearing sleeve 52 and one of a pair of matching holes or recesses formed in the shaft 51.

If, for example, the implement has been forming a single central swath with the aid of the guide rods 27 and it is then desired to form two separate swaths with the aid of the guide rods 27A, the locking pin 55 corresponding to the guide rods 27 is released and the bearing sleeve 52 is turned about the shaft 51 to bring it to its inoperative position in which position the locking pin 55 is re-engaged. The locking pin 50 is then released and the bearing sleeve 48 is turned through 180° about the stub shaft 49 whereafter the locking pin 50 is re-engaged. The locking pin 55 corresponding to the guide rods 27A is then released and the bearing sleeve 52 is turned about the shaft 51 to bring it from its inoperative to its operative position in which the locking pin 55 is re-engaged. The various parts then occupy the relative positions illustrated in FIGURE 5.

Figure 6:
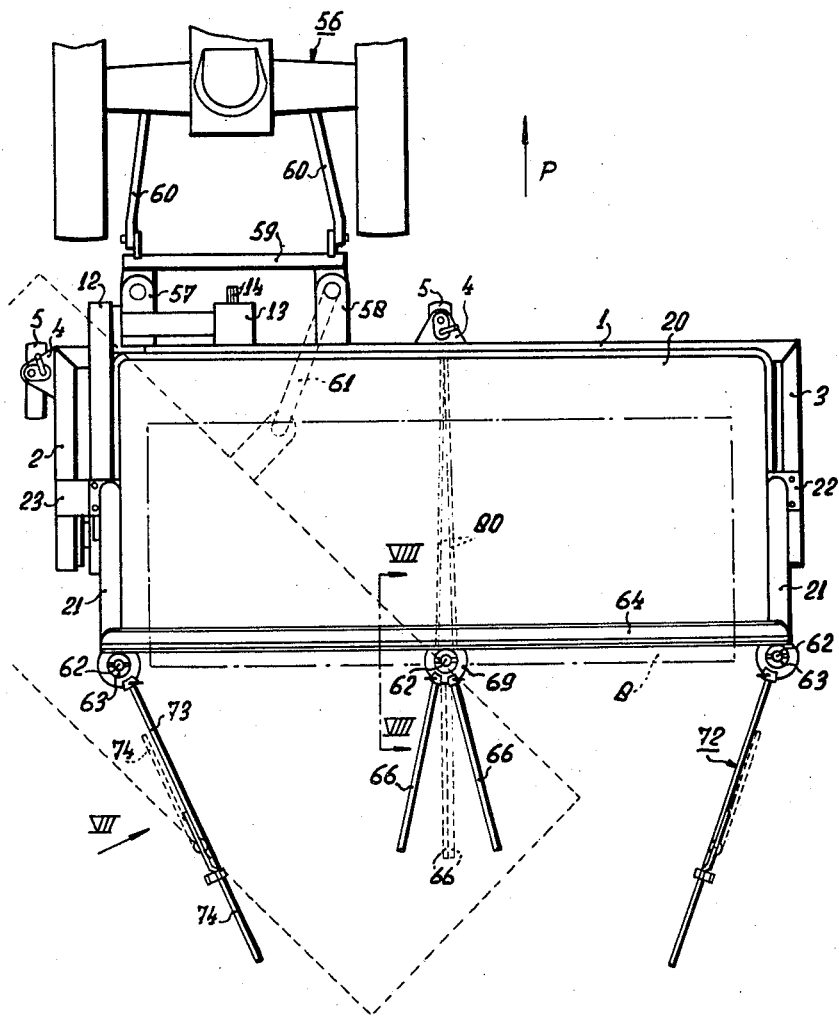

FIGURE 6 illustrates an alternative embodiment of the implement illustrated in FIGURE 1, this implement being adapted, as illustrated, to be coupled to a tractor 56 or other propelling vehicle at two relatively spaced points. The two ground wheels 5 of the implement are arranged in front of the body 8 and one of them is disposed at one side or end of the implement while the other is disposed approximately centrally of the implement. The frame beam 1 of the implement is provided with two forwardly projecting lugs 57 and 58 which are coupled to further similar lugs carried by a transverse beam 59 pivotally connected to two coupling arms 60 projecting from the rear of the tractor 56. In order to bring the implement to a transport position in which its overall width is substantially reduced, a bar 61 can be arranged between the lug 58 and the corresponding lug carried by the beam 59 as illustrated in broken lines in FIGURE 6.

Figure 8:
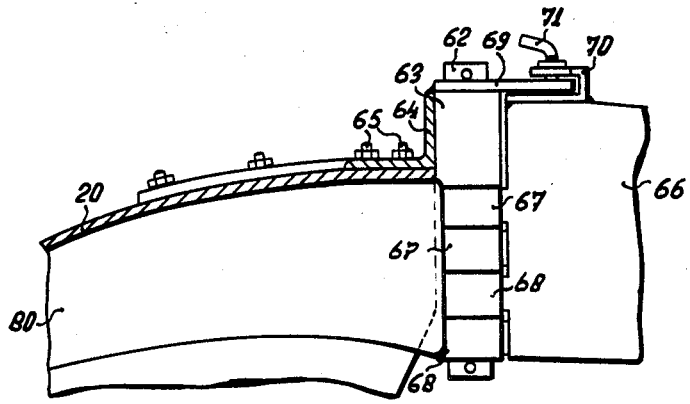

The implement illustrated in FIGURE 6 has guide members which are afforded by plates instead of by rods, the central guide plates 66 being turnable about a vertical shaft 62 which is journalled in a vertical bearing 63 secured to the rear edge of the baffle 20 with the aid of a bar 64 of approximately L-shaped cross-section and a series of bolts 65 (FIGURE 8).

Each guide plate 66 has two bearing sleeves 67 and 68 secured to it, the said shaft 62 being entered through the sleeves. As can be seen in FIGURE 8, the bearing sleeves 67 and 68 of one of the plates 66 are spaced from one another and staggered vertically relative to the similarly spaced bearing sleeves 67 and 68 of the other guide plate 66. The spacing between the bearing sleeves 67 and 68 is such that the two pairs of sleeves cooperate with the shaft 62 in vertically sandwiched relationship. The uppermost end of the fixed vertical bearing 63 carries a sector plate 69 in which a number of holes are formed at equal distances from the longitudinal axis of the shaft 62. Each of the two guide plates 66 carries a bracket 70 on its uppermost edge, the said bracket supporting a vertical locking pin 71 whose tip can be entered through any one of the holes formed in the sector plate 69 to retain the guide plate 66 which is connected to it in a corresponding angular setting about the shaft 62. Each of the guide plates 66 has a length of about 100 cm. which is the same as the length of the guide members afforded by the rods 36 and 37 illustrated in FIGURE 1.

Figures 7, 9:
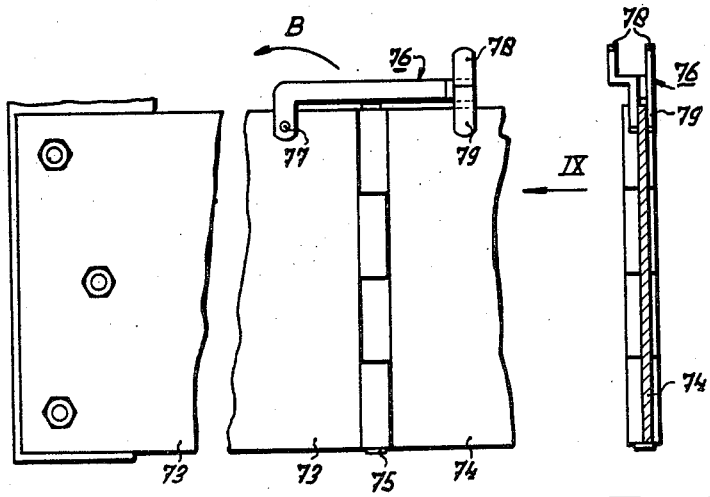

Two guide members afforded by plates 72 are provided at opposite ends of the rear edge of the baffle 20, each such guide plate 72 being pivotally connected to the baffle 20 in a substantially identical manner to that which has just been described in connection with the central guide plates 66. Each guide plate 72 is formed in two portions 73 and 74 which are pivotally connected to one another by a substantially vertical shaft 75 (FIGURE 7). The portion 74 can occupy either a position in which it is substantially coplanar with the portion 73 or, alternatively, a position in which it is turned through 180° about the shaft 75 so as to lie alongside the portion 73 so as to act as an extension thereof. This latter position is shown in broken lines in FIGURE 6. When the two portions 73 and 74 extend in coplanar relationship, their total length is approximately 175 cm. whereas, when the portion 74 is turned into the position shown in broken lines in FIGURE 6, the length of the effective portion 73 is about 100 cm., that is to say, the same as the length of each of the guide plates 66.

A hook 76 (FIGURES 7 and 9) is provided to retain each portion 74 in either extended or retracted relationship relative to the corresponding portion 73. The hook 76 is pivoted to the portion 73 adjacent the uppermost edge thereof by a horizontal pivot pin 77 and the end thereof remote from the pivot pin 77 has two projecting limbs 79 which are spaced apart by a distance equal to the thickness of the portion 74 and two further limbs 78 which project in the opposite direction to the limbs 79 and which are spaced apart by a distance sufficient to receive both the portions 73 and 74 between them. FIGURES 7 and 9 show the hook 76 in the position in which it retains the portion 74 in coplanar relationship with the portion 73 but, upon turning the hook 76 through a short distance in the direction indicated by the arrow B, subsequently turning the portion 74 through 180° about the shaft 75 and finally turning the hook 76 through a further distance in the direction B, the portion 74 can be retained in its retracted position.

In the use of the implement illustrated in FIGURE 6, it is moved over the ground in the direction indicated by the arrow P by the tractor 56 or by some other suitable propelling vehicle. When it is desired to form only a single central swath, the guide plates 66 are retained in the position illustrated in broken lines in FIGURE 6 in which they extend substantially parallel to the direction P while the two guide plates 72 are disposed substantially as illustrated in full lines with their portions 73 and 74 in coplanar relationship. When, on the other hand, it is desired to form two separate swaths, the central guide plates 66 are placed in approximately the positions illustrated in full lines in FIGURE 6 while the portions 74 of the guide plates 72 are turned into their retracted positions. The implement is disposed partly to one side of the path of travel of the tractor 56 and the arrangement is such that, when the implement is arranged to form two separate swaths, the driven wheels of the tractor 56 are in substantial alignment with the gaps which are left between the swaths that are formed.

As can be seen in FIGURES 6 and 8, the concave or underside of the curved plate of the baffle 20 is provided with two guide plates 80 which diverge gently towards the rearmost edge of the baffle 20 and which also increase progressively in their radial height (relative to the axis of rotation of the body 8) from the leading edge to the rearmost edge of the baffle 20. These guides plates 80 act to provide a preliminary separation of the displaced crop or like material into two swaths but, when the central guide plates 66 are retained in their inoperative positions, as shown in broken lines in FIGURE 6, the guide plates 72 act to reunite the partially separated crop or like material into a single swath.

Figure 10:
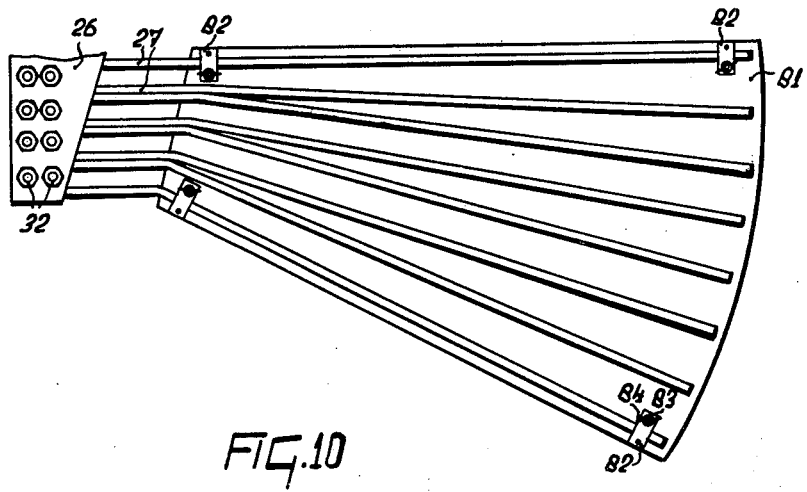

When the implement illustrated in FIGURE 1 is used to work very short crop or like material, there is a danger that a substantial amount of this material will pass between the relatively spaced guide rods of the guide members and, in these circumstances, additional members of the kind illustrated in FIGURE 10 may be employed to overcome this tendency. Each such member is afforded by a plate 81 which can be releasably secured to the upper and lowermost rods 27, 27A, 36 or 37 of each guide member with the aid of brackets 82, bolts or studs 83 and wing nuts 84. When a plate 81 is in position, it closes the gaps between the guide rods in the regions through which short crop or like material might otherwise pass.

Figure 11:
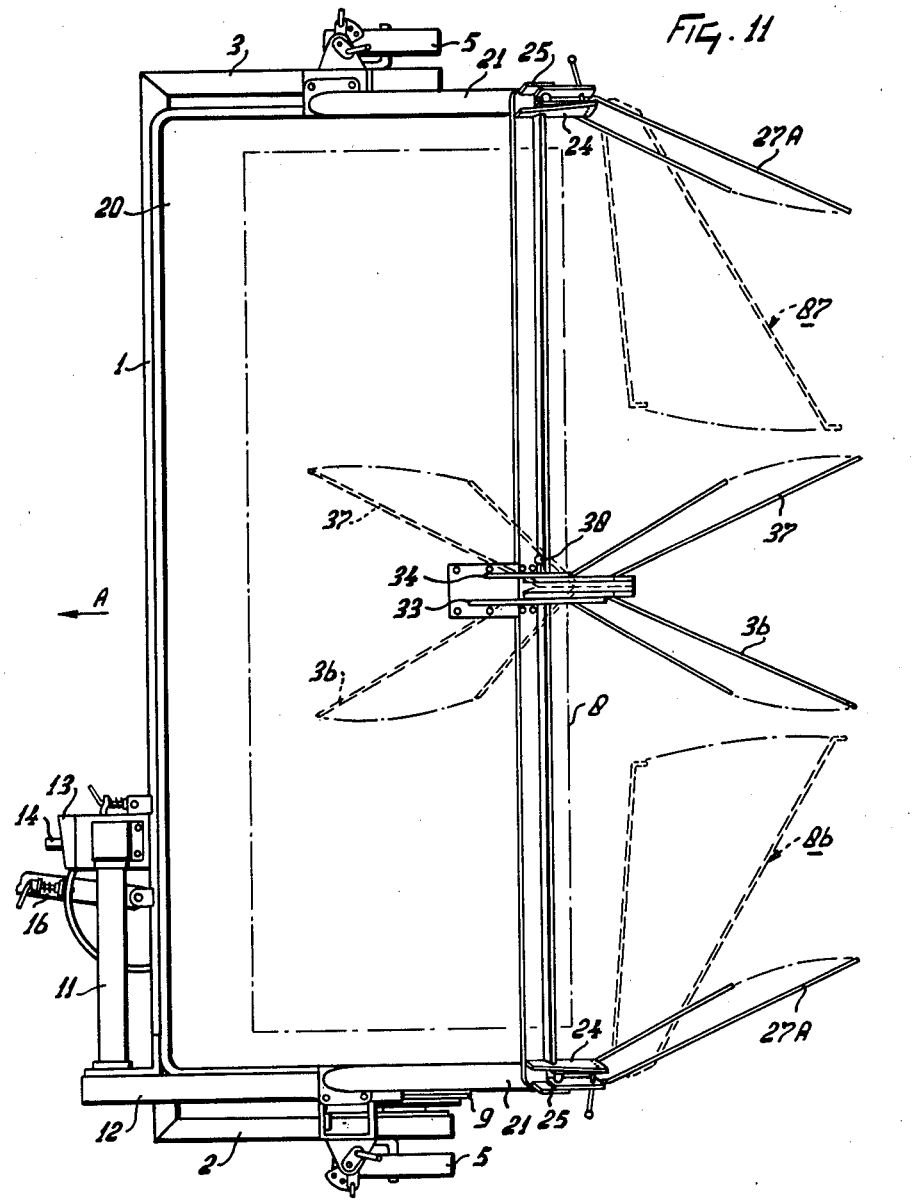
FIGURE 11 is a plan view of a further alternative embodiment of an implement in accordance with the invention.

The implement shown in FIG. 11 corresponds at least mainly with the drum tedder shown in FIG. 1 and similar parts are designated by the same reference numerals. In this embodiment two auxiliary guide members 86 and 87 can be coupled with the device, if the crop worked by the drum is to be collected in a large windrow. The guide members 86 and 87 are fastened to the supporting members 26, by means of which the main guide members 27 are coupled with the frame. Since the shape and the fastening of the guide members 86 and 87 are the same for both members, only the shape and the fastening of the guide member 86 will be described in detail. The guide member 86 comprises a plurality of bars 88 to 95, lying one above the other. The bars are made pairwise from one length of curved steel wire, so that they are pairwise integral with each other and are interconnected by a U-shaped intermediate piece 96. The parts 96 of the bars 88 and 95 are clamped tight between two plates 97 and 98 by means of bolts 99.

Figure 15:
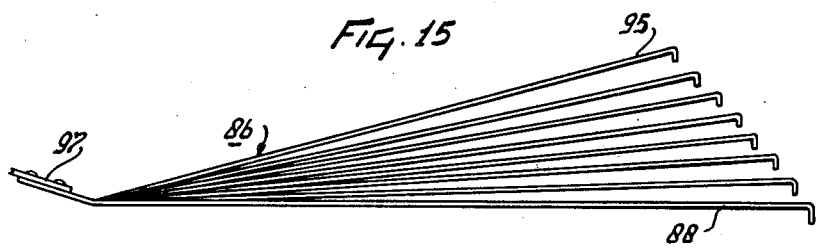
FIGURE 15 is a plan view of the arrangement of FIGURE 15.

From FIG. 15 it will appear that the part 96 of the bar 88 is at an angle of about 18° to the bar portion joining the part 96 of said bar while the part 96 of the bar 95 is at an angle of about 40° to the bar portion joining the part 96 of said bar 95. Viewed in a direction at right angles to the plate 97 the bar 88 is parallel to a straight line. The bars lying below the former extend from the plate 97 over a given distance parallel to the bar 88, the further portions of the bars being downwardly inclined with respect to the bar 88. The length of the bars is approximately equal to one-and-a-half times the diameter of the drum and the length of the bars of the main guide members is approximately equal to the diameter of the drum.

The distance between the free end of the uppermost bar and the free end of the lowermost bar is approximately equal to 9/10 of the diameter of the drum. The distances between the free ends of the bars are equal.

Figure 12:
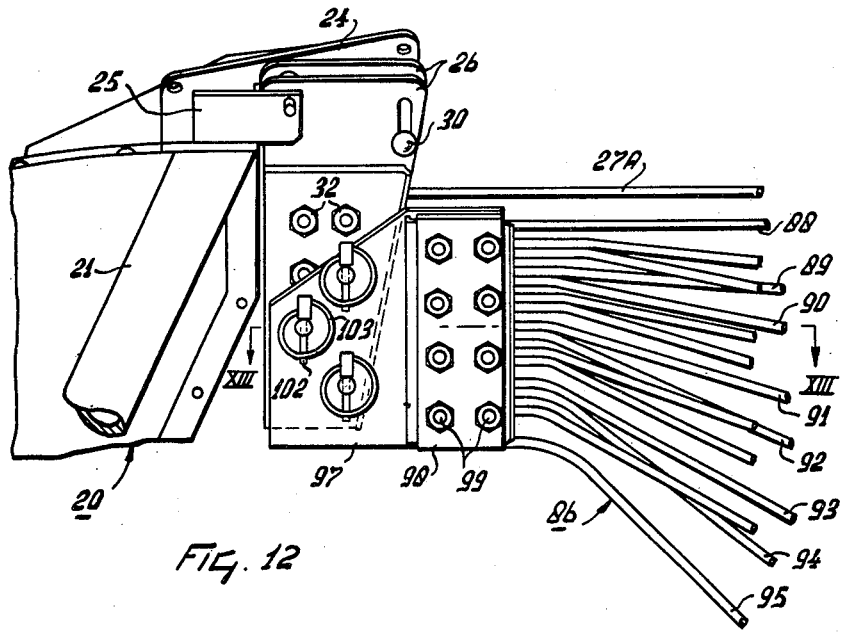
FIGURE 12 is an elevation to an enlarged scale showing a supporting member to which a second group of bars is secured.
Figure 13:
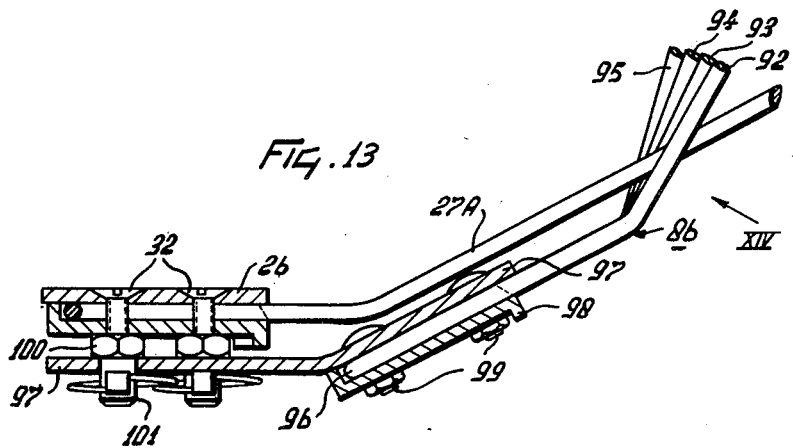
FIGURE 13 is a sectional view taken on the line XIII—XIII in FIGURE 12.
Figure 14:
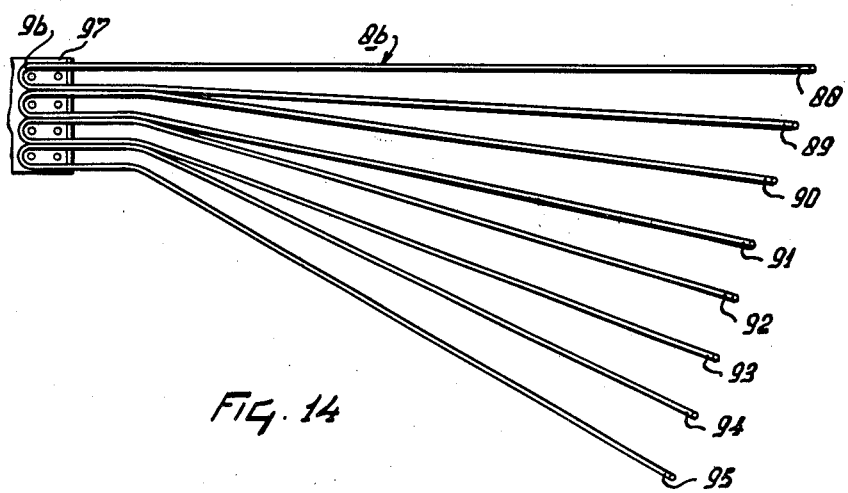
FIGURE 14 is an elevation of the second group of bars viewed in the direction of the arrow XIV in FIGURE 13.

It will furthermore be seen from FIG. 12 that the plate 97 is larger than the plate 98. A few bolts 32, by means of which the bars of the main guide member are clamped tight to the supporting member 26, are provided with nuts 100, having prolongations 101. The plate 97 is provided with a few holes so that the plate 97 can be slipped onto the prolongations 101. The plate 97 is held in place on the prolongations 101 by means of pins 102, taken through holes provided in the prolongations, with which pins spring rings 103 are coupled. The ends of the ring 103 are inserted into holes provided in the pin 102 at a given distance from each other. Owing to the spring tension in the ring 103 this ring is held in the position shown in the figures, the ring then preventing the pin 102 from slipping out of a hole in the prolongation 101. In order to remove the pin 102 from the hole, the ring 103 can be turned upwards.

From the figures it furthermore appears that the bars of the guide members 86 and 87 are shaped so that, when the plate 97 is coupled with the frame, they emerge from between the bars of the main guide member and are located, viewed from the front side of the device, in front of the bars of the main guide members. The lowermost bars 95 extend substantially parallel to the axis of rotation of the drum when seen in plan view, while the uppermost bars 88 are at an angle of about 45° to the axis of rotation of the drum. The free ends of the bars 88–95 are bent such that they extend substantially parallel to a plane which is perpendicular to the axis of rotation of the drum. Thus the crop displaced by the drum will no longer come into contact with the main guide members but will contact the auxiliary guide members 86 and 87. The distance between the ends of the bars of the guide members 86 and 87 is approximately equal to one third of the length of the drum.

When the guide members 86 and 87 are utilized in operation, the guide members arranged at the center of the drum will preferably be moved into the position indicated in broken lines in FIG. 11. In operation the crop displaced by the drum will be deposited in a large windrow centrally behind the drum.

The auxiliary guide members, together with the main guide members, can be swung into a position in which they are located above the screening hood.

With the aid of the structure described with reference to FIGS. 11 to 15 auxiliary guide members can be mounted rapidly and easily on the implement, so that the implement can be readily changed over from the working position in which two swaths are formed, into a working position in which one large windrow is formed. The aforesaid shape of the bars of the auxiliary guide members ensure a satisfactory guide of the crop.

Since an auxiliary guide member is coupled, at the place lying on the side of the bars of the main guide members remote from the side engaging the crop with the implement, the coupling members used to this end do not come into contact with the crop, so that they do not hinder the delivery of the crop.

What I claim is:

1. A tedder comprising a tined body rotatable in a direction opposite to the intended direction of travel, a baffle extending over said body and guide means mounted to the rear of said baffle, said guide means comprising adjustable guide members which define crop deflector surfaces mounted adjacent the sides of said baffle for varying the effective crop-working surfaces of said guide members and further guide members mounted between said adjustable guide members, said further guide members being displaceable from an operative to an inoperative position whereby said members are arrangeable to form a single swath of crop in a first setting and two separate swaths of crop in a second setting, the width of the single swath being less than the total width of the separate swaths.

2. The invention of claim 1 wherein the tedder is provided with ground wheels, said wheels being located in front of the tined body and being angularly adjustable.

3. The invention of claim 1 wherein the angle of rotation of said tined body is adjustable relative to the intended direction of travel.

4. The invention of claim 1 wherein the adjustable guide members are comprised of rods arranged in divergent fanshaped relationship.

5. The invention of claim 1 wherein the adjustable guide members are comprised of guide plates.

6. The invention of claim 1 wherein the adjustable guide members are provided with extensions.

7. The invention of claim 1 wherein the adjustable guide members are provided with means whereby the deflector surfaces can be inclined at different angles relative to the further guide members.

8. The invention of claim 1 wherein the adjustable guide members are turnable about the same axis and locking means is provided for retaining the surfaces in selected settings.

9. The invention of claim 8 wherein the adjustable guide members are turnable about two axes, one of said axes being substantially horizontally disposed, the other of said axes being substantially vertically disposed.

10. The invention of claim 1 wherein the adjustable guide members are pivotable about axes inclined to the horizontal and means are provided for locking said surfaces in various positions of height relative to the ground.

11. The invention of claim 10 wherein the uppermost ends of said axes are disposed towards the removable guide members.

12. A tedder comprising a tined body rotatable in a direction opposite to the intended direction of travel, a baffle extending over said body and guide means mounted to the rear of said baffle, said guide means comprising adjustable guide members mounted adjacent the sides of said baffle, said adjustable guide members being provided with auxiliary guide units, and further guide members mounted between said adjustable guide members, said further guide members being displaceable from an operative to an inoperative position.

13. The invention of claim 12 wherein the auxiliary guide units are inclined at greater angles to a plane perpendicular to the axis of rotation of said tined body than said adjustable guide members.

14. The invention of claim 13 wherein the adjustable guide members and the auxiliary guide units are both comprised of rods, the free ends of the rods of said units extending between the rods of said adjustable guide members.

15. The invention of claim 14 wherein the adjustable guide members are connected to supports secured adjacent the sides of the baffle and said auxiliary guide units are coupled to said supports.

16. The invention of claim 14 wherein the tined body is a drum and the length of the auxiliary guide rods is approximately equal to one and a half times the diameter of the drum.

17. The invention of claim 14 wherein the tined body is a drum and the distance between the top and the bottom rods of said units is approximately equal to nine-tenths of the diameter of the drum.

18. The invention of claim 14 wherein the top rods of said units are inclined towards the axis of rotation of said tined body at an angle of about 45°.

19. The invention of claim 14 wherein the bottom rods of said units are inclined towards the axis of rotation of said tined body at an angle less than 30°.

20. The invention of claim 19 wherein the bottom rods extend substantially parallel to the axis of rotation of said tined body.

21. The invention of claim 13 wherein the tined body is a drum and the distance between the free ends of said auxiliary guide units mounted on each side of the baffle is approximately equal to one-third the length of the drum.

References Cited by the Examiner

UNITED STATES PATENTS

| | | | |
|---|---|---|---|
| 2,539,834 | 1/51 | Hatton | 56—372 |
| 2,690,640 | 10/54 | Orendorff et al. | 56—372 |
| 2,771,732 | 11/56 | Schramling | 56—372 |
| 3,059,403 | 10/62 | Bamford et al. | 56—372 X |

T. GRAHAM CRAVER, *Primary Examiner.*

RUSSELL R. KINSEY, *Examiner.*